Feb. 10, 1970   J. C. MARTIN   3,494,276
COLD WATER POUR IN BEVERAGE APPARATUS
Filed July 18, 1968   3 Sheets-Sheet 1

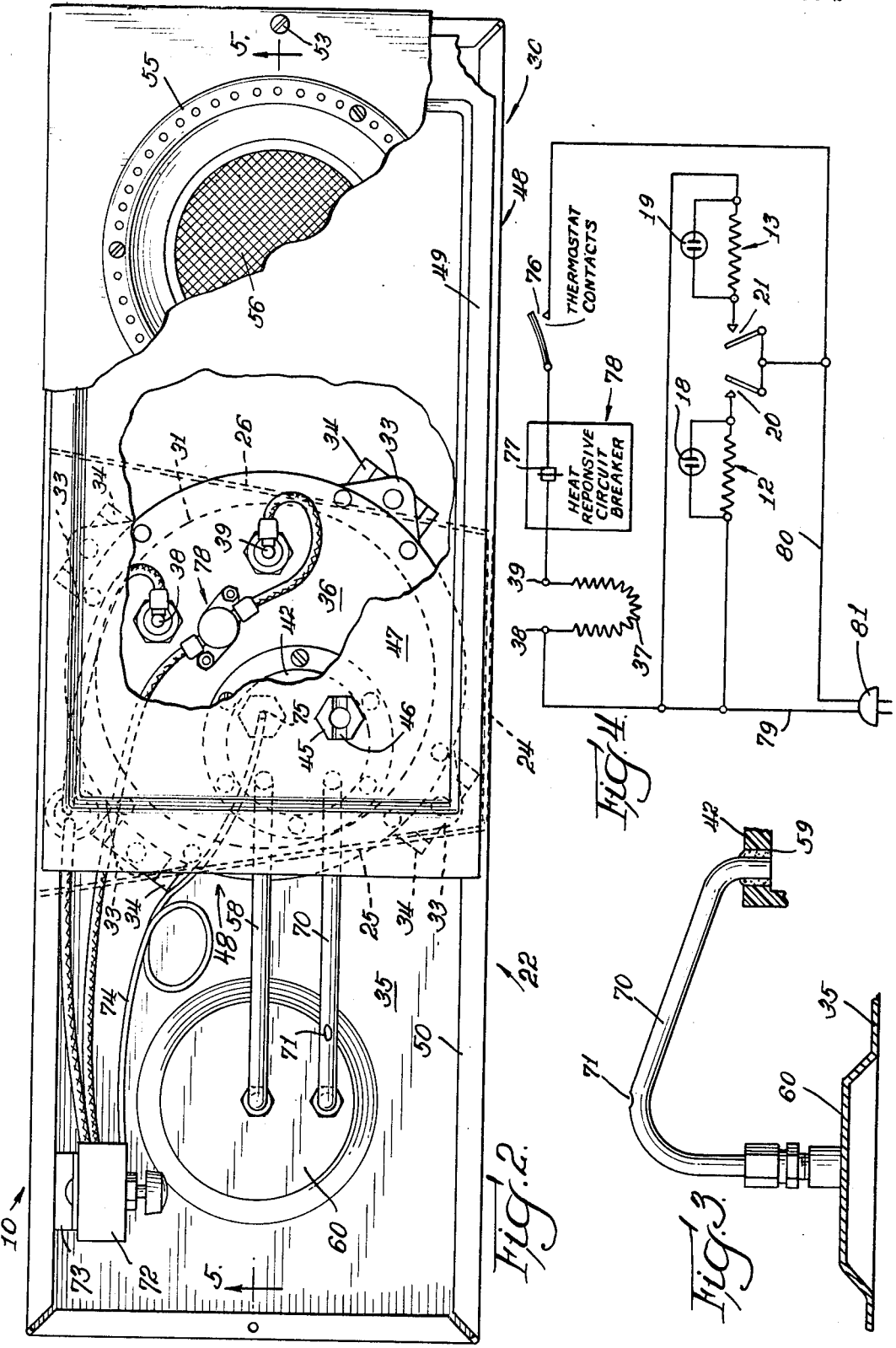

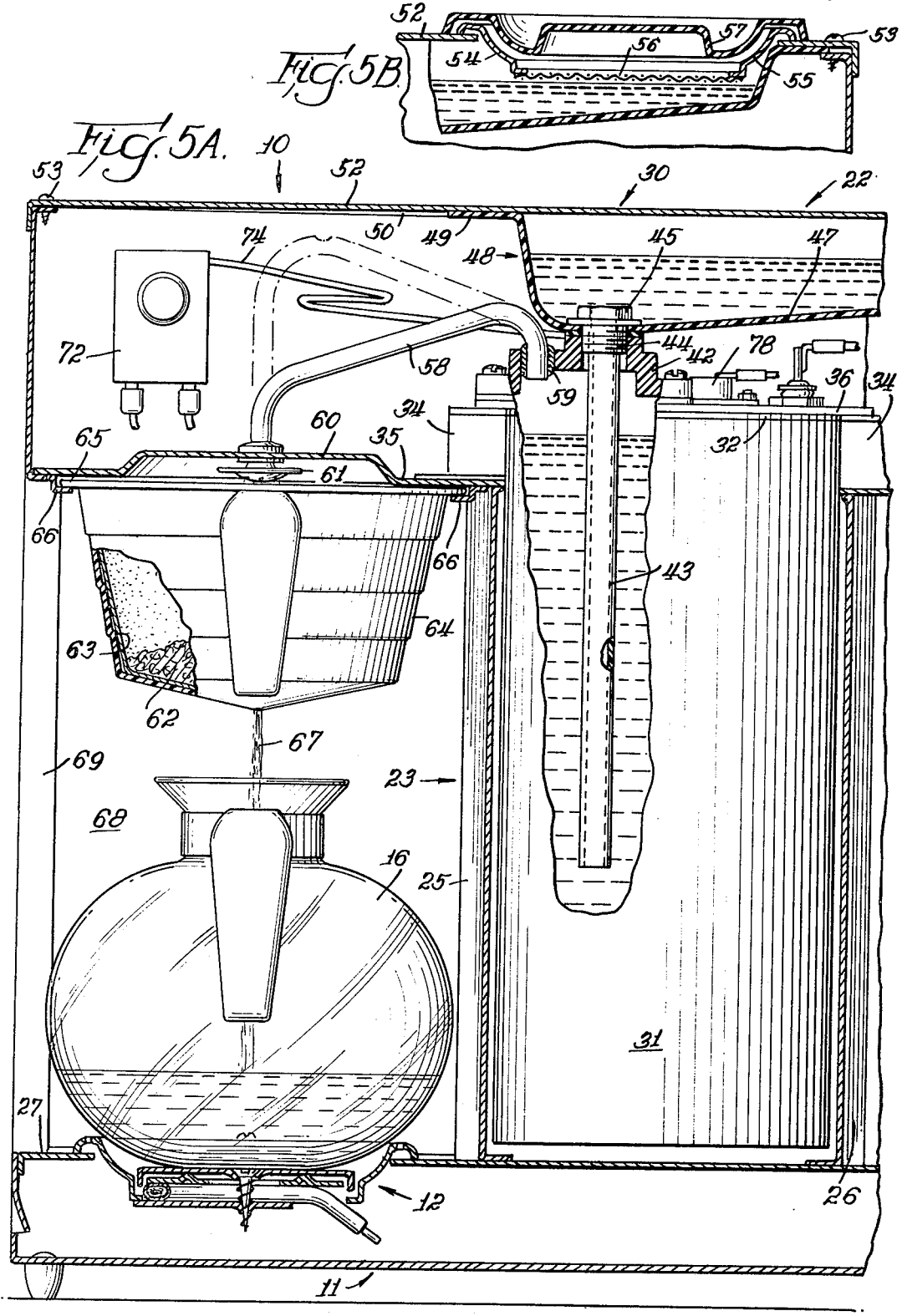

United States Patent Office 3,494,276
Patented Feb. 10, 1970

3,494,276
COLD WATER POUR IN BEVERAGE APPARATUS
John C. Martin, Springfield, Ill., assignor to Bunn-O-Matic Corporation, Springfield, Ill., a corporation of Delaware
Filed July 18, 1968, Ser. No. 745,873
Int. Cl. A47j 31/56
U.S. Cl. 99—282       4 Claims

ABSTRACT OF THE DISCLOSURE

A generally T-shaped structure is mounted on a base casing with the stem of the T-shape midway its ends and containing a hot water tank which extends into the bar portion of the T-shape which constitutes a hood. A discharge head, carried by a bottom wall of the hood on one side of the stem portion, is connected to the tank by a discharge water line to supply hot water to a coffee grounds carrying funnel from which coffee extract flows into a beaker on a heater on the base casing on the one side of the stem portion. An inlet water line for the water tank is connected to the bottom of a cold water receiving basin which extends in the hood toward the other end of the bar portion. A lid closes off the top of the hood and has an opening near the other end of the bar portion. A second heater on the base casing on the other side of the stem portion is arranged to keep the contents of a second beaker at an elevated temperature. The stem portion is generally trapezoidal in cross section with the shorter side in front and a back wall extends from the longer side to the ends of the bar portion and the base casing.

---

Figure 1:
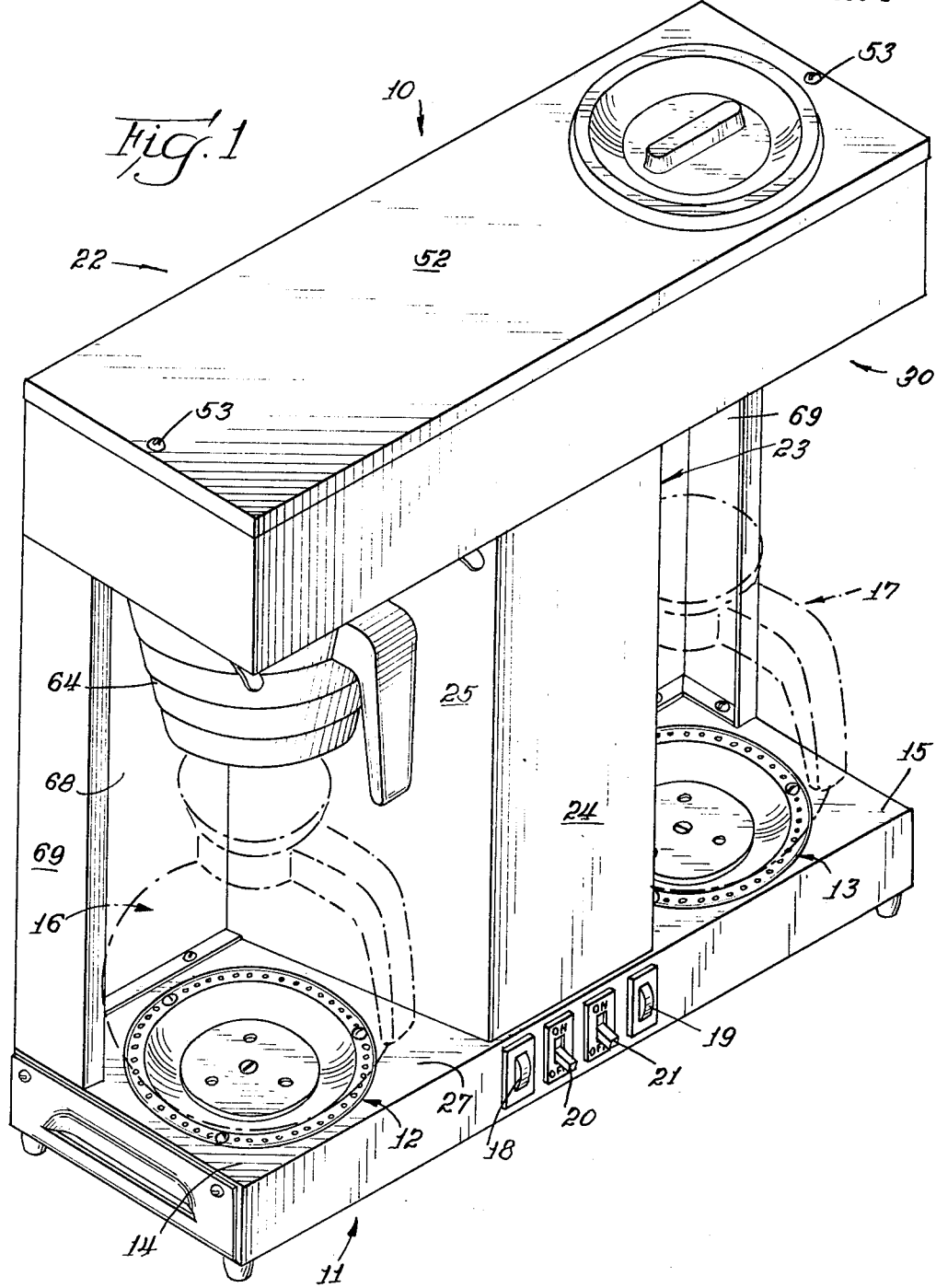

This invention is an improvement over the constructions disclosed in Patent Re. 25,663, issued Oct. 13, 1964 and Patent Nos. 3,220,334, issued Nov. 30, 1965 and 3,385,-201, issued May 28, 1968.

Among the objects of this invention are: To provide a compact and sturdy beverage making apparatus in which a T-shaped structure is mounted on a base casing with a hot water tank in the stem portion and the bar portion carrying a discharge head at one end and having a cold water pour in basin at the other end; to locate a cold water pour in opening in a lid for the bar portion at its other end; to position beaker heaters on the base casing on opposite sides of the stem portion to insure that one beaker does not contact the other when they are placed on or removed from the respective heater; to increase the available area on the front portion of the base casing by making the stem portion trapezoidal in cross section; and to extend a back wall from the longer side of the stem portion to the ends of the base casing and of the hood in order to rigidify the entire structure.

In the drawings: FIG. 1 is a perspective view of cold water pour in beverage apparatus embodying this invention. FIG. 2 is a top plan view, at an enlarged scale, of the apparatus shown in FIG. 1, parts being broken away to show certain details of construction. FIG. 3 is an elevational view of the air vent line, the portion of the water tank fitting to which it is connected being shown in section. FIG. 4 is a diagram of the circuit connections that can be used. FIGS. 5A and 5B, the latter being placed to the right of the former, show a vertical cross sectional view taken generally along line 5—5 of FIG. 2.

In the drawings, the reference character 10 indicates cold water pour in beverage apparatus that is particularly suitable for making coffee extract. The apparatus 10 includes a base casing that is indicated, generally at 11 and is formed of sheet metal. The base casing 11 is a rectangular parallelepiped. Beaker heaters 12 and 13 are mounted near the ends 14 and 15 of the base casing 11 for maintaining the liquid contents of beakers 16 and 17 at an elevated temperature. The beaker 16 is intended to receive coffee extract as it is made. The beaker 17 can be employed either for maintaining coffee extract at the proper temperature or for heating water for tea making purposes or the like. Indicating lamps 18 and 19 are mounted on the front side of the base casing 11 and are indicated in the diagram, FIG. 4. Preferable the indicating lamps 18 and 19 are of the gas filled type. They are connected in shunt with the heating elements of the beaker heaters 12 and 13 and their energization is controlled by control switches 20 and 21 also mounted on the front side of the base casing 11.

Surmounting the base casing 11 is a T-shaped structure that is indicated, generally, at 22. The stem portion 23 of the T-shaped structure 22, which preferably is formed of sheet metal, is mounted midway the ends 14 and 15 of the base casing 11 and is suitably secured thereto. The stem portion 23 is trapezoidal in cross section as shown more clearly by broken lines in FIG. 2. The short side 24 is in front and the sides 25 and 26 diverge. This construction provides more space on the top wall 27 of the base casing 11 adjacent the front side thereof than would be provided if the sides 25 and 26 extended at right angles from the short side 24. The bar portion or hood 30 of the T-shaped structure 22 is coextensive with the base casing 11 and is in the form of a rectangular parallelepiped.

As shown more clearly in FIG. 5A a metallic hot water tank 31 is located in the stem portion 23. The diverging sides 25 and 26 of the stem portion are positioned closely to the sides of the cylindrical hot water tank 31 and diverge for the reasons outlined above. At its upper end the hot water tank 31 has an outstanding flange 32 from which ears 33, FIG. 2, project for mounting on and attachment to brackets 34 which extend upwardly from a bottom wall 35 of the bar portion or hood 30. A metallic cover disc 36 overlies the outstanding flange 32 and is suitably secured thereto. Within the water tank 31 there is positioned a heater element that is shown diagramatically at 37 in FIG. 4. Terminals 38 and 39 of the heater element 37 are shown in FIG. 2.

A plastic fitting 32 is suitably mounted on the metallic cover disc 36 and extending therethrough is an inlet waterline 43 that is a molded tube of plastic. As shown in FIG. 5A the upper end 44 of the inlet water line 43 is threaded and is surmounted by a hexagonal top 45 in which there is formed a transverse slot, FIG. 2, to facilitate the flow of water into the inlet water line 43. The upper end 44 of the inlet water line 43 extends thru a bottom wall 47 of a cold water receiving basin 48 that is formed of plastic. A sealed connection is provided between the bottom wall 47 of the basin 48 and the plastic fitting 42, when the upper end 44 is screwed into the plastic fitting 42. A flange 49 extends laterally from the basin 48. It overlies an inturned flange 50 on the upper end of the bar portion or hood 30.

The upper end of the bar portion or hood 30 is closed by a metallic lid 52 which is secured in place by screws 53. A cold water pour in opening 54 is provided at one end of the lid 52 as shown in FIG. 5B. An annular rim 55 surrounds the opening 54 and carries a screen 56 thru which the cold water is pourned into the basin 48. A cover 57, preferably formed of plastic, is arranged to overlie the rim 55 and screen 56 to reduce to a minimum the loss of water by evaporation through the opening 54.

Hot water from the tank 31 flows through a discharge water line 58, FIG. 5A. One end of the discharge water line 58 extends from the plastic fitting 42 in which it is held by a potting compound 59. The other end of the discharge water line 58 extends through a raised portion 60 of the bottom wall 35 and is connected to a discharge head 61 which has a plurality of openings through which the hot water flows to infuse ground coffee 62 that is positioned on a paper filter 63 which is carried by a funnel 64. The funnel 64 has an outstanding flange 65 that is arranged to slide along angles 66 which are located on the underside of the bottom wall 35. Coffee extract 67 flows from a discharge opening at the bottom of the funnel 64 into the beaker 16 therebelow.

The diverging sides 25 and 26 of the stem portion 23 extend to a rear wall 68 which is coextensive with both the base casing 11 and the bar portion or hood 30. A part of the rear wall 68 between the diverging sides 25 and 26 forms the long side of the trapezoid. Sections 69 extend forwardly from the ends of the rear wall 68 to provide additional support between the base casing 11 and the bar portion or hood 30.

As shown in FIG. 3 an air vent line 70 extends from the plastic fitting 42 to the raised portion 60 of the bottom wall 35 so that any water which might be caused to flow thru the air vent line 70 will discharge into the funnel 64. A vent opening 71 is formed in the uppermost part of the air vent line 70 in order to prevent any siphoning action.

For controlling the temperature of the water in the tank 31, an adjustable thermostat 72, FIG. 2, is employed. The thermostat 72 is mounted within the bar portion or hood 60 on a suitable bracket 73. A tubular connection 74 runs from the thermostat 72 to a heat responsive element 75 which extends into the interior of the water tank 31 thru the plastic fitting 42. Thermostat contacts 76, FIG. 4, are provided in the thermostat 72 and are arranged to complete an energizing circuit for the heater element 37. The energizing circuit for the heater element 37 is completed through normally closed contacts 77 of a heat responsive circuit breaker that is indicated, generally, at 78. As shown in FIG. 2, it is mounted on the metallic cover disc 36. In the event that excessive temperature is developed in the water tank 31 by the heater element 37, due for example to low water level, the construction of the circuit breaker 78 is such as to open its contacts 77 and interrupt the energizing circuit for the heater element 37. As soon as the ambient temperature is reduced to a predetermined value, the contacts 77 of the heat responsive circuit breaker 78 are closed and the heating cycle is repeated.

As shown in FIG. 4, conductors 79 and 80 are connected to a plug 81 which can be inserted in a conventional socket that is energized at a voltage of 115 volts alternating current.

In operation, sufficient cold water is poured thru the screen 56 to cause water to siphon out of the water tank 31 and flow out of the discharge head 61. Then the plug 81 is inserted in a suitable energized receptacle and sufficient time allowed to elapse to permit the water in the tank 31 to be heated by the heater element 37 to the desired operating temperature. The beaker 16 is placed on the beaker heater 12 and switch 20 is operated to complete the energizing circuit therefor which is shown by the indicating lamp 18. A suitable amount of ground coffee 62 is placed on the paper filter 63 in the funnel 64 and it is placed in position on the angles 66 underneath the spray head 61. A corresponding amount of cold water is poured thru the screen 56. This displaces the hot water at the top of the tank 31 and it flows thru the discharge water line 58 and sprays over the ground coffee 62 to form the coffee extract 67. The flow of hot water continues until the siphon is broken by the lowering of the level of the hot water in the tank 31 below the level of the intake end of the discharge water line 58. Thereafter the beaker 16 filled with coffee extract can be placed on the beaker heater 13 which is energized on operation of the control switch 21 and another beaker then can be placed on the beaker heater 12 and the foregoing cycle repeated.

What is claimed as new is:

1. A machine for heating water for making coffee extract and for other purposes comprising
   a base casing
   a generally T-shaped structure carried by said base casing with the lower end of the stem portion midway the ends of said base casing and the bar portion forming a hood coextensive with and overlying said base casing,
   a water tank in said stem portion with its upper end extending into said hood,
   means for heating water in said tank,
   a discharge head carried by a bottom wall of said hood on one side of said stem portion near one end of said bar portion,
   a discharge water line interconnecting said upper end of said water tank and said discharge head,
   means underneath said discharge head for receiving hot water therefrom,
   a beaker below said hot water receiving means,
   heating means on one end of said base casing on said one side of said stem portion for supporting said beaker and maintaining the contents thereof at an elevated temperature,
   an inlet water line for said water tank opening upwardly in said hood,
   a cold water receiving basin at one end overlying said water tank with the other end extending to the other side of said stem portion and toward the other end of said bar portion and connected at its bottom to said inlet water line, and
   a lid closing off the top of said hood and having an opening near said other end of said bar portion through which cold water can be poured into said basin.

2. The machine according to claim 1 wherein heating means on the other end of said base casing on the other side of said stem portion is provided for receiving a second beaker and maintaining the contents thereof at an elevated temperature.

3. The machine according to claim 1 wherein said stem portion is generally trapezoidal in cross section with the shorter side in front to provide additional space on the front side of said base casing.

4. The machine according to claim 1 wherein support means for said bar portion extend from the long side of said stem portion to the ends of said bar portion and of said base casing.

References Cited

UNITED STATES PATENTS

| Re. 25,663 | 10/1964 | Bunn | 99—283 |
| 3,220,334 | 11/1965 | Martin | 99—282 |
| 3,354,810 | 11/1967 | Lorang | 99—282 |
| 3,385,201 | 5/1968 | Martin | 99—282 |

ROBERT W. JENKINS, Primary Examiner